(12) United States Patent
Appelman (10) Patent No.: US 12,452,292 B1
(45) Date of Patent: Oct. 21, 2025

(54) INSPECTING REQUESTS AND RESPONSES TO IDENTIFY APPLICATION VULNERABILITIES

(71) Applicant: CLOUDFLARE, INC., San Francisco, CA (US)

(72) Inventor: Michiel Louis Appelman, Amersfoort (NL)

(73) Assignee: CLOUDFLARE, INC., San Francisco, CA (US)

( * ) Notice: Subject to any disclaimer, the term of this patent is extended or adjusted under 35 U.S.C. 154(b) by 34 days.

(21) Appl. No.: 18/744,401

(22) Filed: Jun. 14, 2024

(51) Int. Cl.
*H04L 9/40* (2022.01)

(52) U.S. Cl.
CPC ...... *H04L 63/1433* (2013.01); *H04L 63/1441* (2013.01)

(58) Field of Classification Search
CPC .................. H04L 63/1433; H04L 63/1441
USPC ............................................... 726/25
See application file for complete search history.

(56) References Cited

U.S. PATENT DOCUMENTS

| | | | | |
|---|---|---|---|---|
| 11,374,945 B1 * | 6/2022 | Senecal | ............... | H04L 63/1416 |
| 11,979,373 B2 * | 5/2024 | Grant | .................... | H04L 67/12 |
| 2004/0010601 A1 * | 1/2004 | Afergan | ............... | H04L 63/0227 |
| | | | | 709/229 |
| 2017/0237768 A1 * | 8/2017 | Daniel | ................... | G06F 21/10 |
| | | | | 726/23 |
| 2020/0159776 A1 * | 5/2020 | Kitchen | ................. | H04L 67/60 |

* cited by examiner

*Primary Examiner* — Teshome Hailu (74) *Attorney, Agent, or Firm* — NICHOLSON DE VOS WEBSTER & ELLIOTT LLP (57) ABSTRACT

An edge server of a cloud-based application vulnerability detection service receives a first request from a requesting device to access a resource hosted by an origin server. The edge server can determine that the first request has indications of including malicious content and block the first request. The edge server can then send a second request to a test environment of the origin server, where the second request is based on the first request. The edge server then receives a response from the origin server responsive to the second request. The cloud-based application vulnerability detection service can analyze the response to determine that the origin server has a vulnerability. The cloud-based application vulnerability detection service then provides information to a customer associated with the origin server indicating that the vulnerability has been blocked by the cloud-based application vulnerability detection service and that the origin server is subject to the vulnerability.

18 Claims, 3 Drawing Sheets

INSPECTING REQUESTS AND RESPONSES TO IDENTIFY APPLICATION VULNERABILITIES

Embodiments of the invention relate to the field of network communications, and more specifically, to using an edge server configured to inspect requests and responses to identify application vulnerabilities.

BACKGROUND

The applications and resources of organizations can often be subjected to malicious attacks attempting to access sensitive information or disrupt the flow of network traffic. As organizations grow in size, the risk of such malicious attacks and the consequences of successful attacks increase. To mitigate the risks of malicious attacks, or to appropriately respond to vulnerabilities, such as breaches or leaks, organizations need a clear understanding of their security landscape.

SUMMARY

An edge server of a cloud-based application vulnerability detection service receives a request from a requesting device to access a resource hosted by an origin server. The edge server analyzes the request to determine if the first request has indications of including malicious content (e.g., a malicious payload). When the request has indications of including malicious content, the edge server can block the request from being processed on behalf of the requesting device. The edge server can then send a new request to a test environment of the origin server (e.g., a copy of the request that was blocked) and receives a response from the origin server responsive to the request. The cloud-based application vulnerability detection service analyzes the response to determine the vulnerability of the origin server to the malicious content. The cloud-based application vulnerability detection service then provides information to a customer associated with the origin server that indicates that the vulnerability has been blocked by the cloud-based application vulnerability detection service and whether the origin server is subject to the vulnerability.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Web application firewalls (WAFs) are network security systems that can evaluate incoming and outgoing network traffic to determine whether the network traffic should be allowed to reach its intended destination or blocked. While a WAF can protect an organization from attacks, to address any vulnerabilities in an organization's networked infrastructure, the organization needs greater insight into what applications, resources, and data are vulnerable to certain malicious payloads.

In one embodiment, a cloud-based application vulnerability detection service is situated within a networked environment to intercept traffic between a requesting device and an origin server hosting applications or other resources. An edge server of the cloud-based application vulnerability detection service can analyze a request from the requesting device to determine if the request has indications of including malicious content (e.g., a malicious payload). For example, the edge server can analyze the contents of the request to identify attributes of the request, including, but not limited to, an identity associated with the request (e.g., an IP address, etc.), a requested resource, and the destination of the request. When the request is determined to have indications of including malicious content, the edge server can block the request to prevent any response being sent back to the requesting device. However, instead of discarding the request, the edge server can forward a new request to the origin server (e.g., a copy of the request that was blocked). In some embodiments, the request can be sent to a test environment of the origin server. In some embodiments, the edge server can flag the request (e.g., with a header value) to indicate that the request has been blocked. Upon receiving a response from the origin server, the cloud-based application vulnerability detection service can determine whether the origin server is vulnerable. For example, the origin server may be vulnerable if the response includes sensitive information (e.g., personally identifiable information). The cloud-based application vulnerability detection service can then provide information to the origin server indicating attacks that were blocked and which attacks the origin server would have been vulnerable to.

In existing systems, firewalls can protect resources by blocking malicious requests and allowing non-malicious requests. However, as these firewalls are limited to either blocking or allowing requests, the intended recipient of a malicious request cannot know whether, or what, applications and data may have been vulnerable to the malicious request. Thus, while the intended recipient is protected from the blocked malicious request, any vulnerabilities of the networked infrastructure of the intended recipient remain present and potentially at risk by subsequent malicious attacks.

Embodiments of the invention provide many technical advantages, in addition to addressing the deficiencies of previous solutions. Identifying and blocking requests that have indications of malicious content, while also forwarding the request to the intended destination to analyze the response returned, can provide the owner of the intended destination with greater insight into the security and vulnerabilities of their networked infrastructure. This can result in improvements in security of their computing infrastructure. For example, improvements to the security of resources can be realized by identifying the vulnerabilities of a system to existing and new common vulnerabilities and exposures (CVEs).

Figure 1:
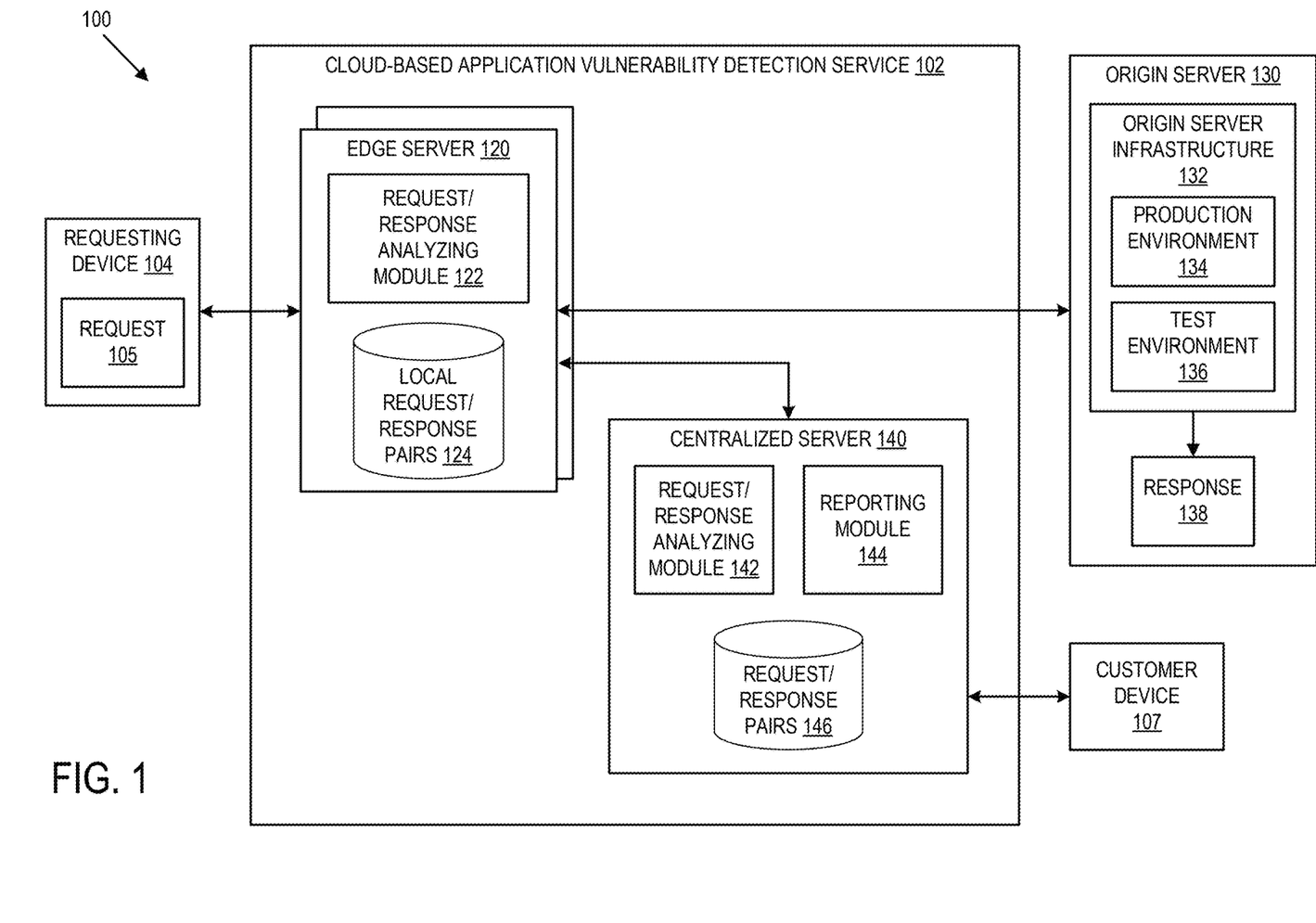
FIG. 1 illustrates an exemplary networked system according to some embodiments described herein.

FIG. 1 illustrates an exemplary networked system according to some embodiments described herein. The exemplary networked system 100 illustrated in FIG. 1 includes a cloud-based application vulnerability detection service 102. The cloud-based application vulnerability detection service 102 is configured to determine if a request has indications of including malicious content (e.g., a malicious payload), block any such request, and then forward a new request based on the blocked request to the appropriate origin server to determine if the origin server is vulnerable to the malicious content of the blocked request (e.g., a response generated by the origin server includes sensitive information). The cloud-based application vulnerability detection service 102 illustrated in FIG. 1 includes an edge server 120 and a centralized server 140 that is connected to and/or in communication with the edge server 120. In embodiments, the edge server 120 can operate as a proxy device for requests from requesting devices (e.g., requesting device 104) directed to resources hosted by an origin server 130. The origin server 130 can be associated with a customer of the cloud-based application vulnerability detection service 102. In embodiments, the customer can interface or communicate with the cloud-based application vulnerability detection service 102 via a customer device 107.

The cloud-based application vulnerability detection service 102 can be a distributed cloud computing network. Such a distributed cloud computing network may provide different services for customers (e.g., domain owners or operators) such as protecting against internet-based threats, performance services (e.g., acting as a content delivery network (CDN) and dynamically caching customer's files closer to visitors, page acceleration/optimization), TCP stack optimizations, and/or other services.

Examples of origin server 130 includes computing devices that may serve and/or generate network resources (e.g., web pages, images, word processing documents, PDF files, movie files, music files, or other computer files). Origin server 130 may also be an edge server to the server that serves and/or generates network resources. Although not illustrated in FIG. 1, it should be understood that the network resources of origin server 130 may be stored separately from the device that responds to the requests. In some embodiments, the origin server infrastructure 132 of the origin server 130 may include a production environment 134 and a test environment 136. The production environment 134 is an environment that includes computing and storage resources that execute software that is live and can serve responses to requests from requesting devices. The test environment 136 may be a separate set of computing and storage resources from the production environment 134 that execute a similar software build as the production environment 134. While the cloud-based application vulnerability detection service 102 blocks requests that have indications of including malicious content from providing a response to the requestor, the request could still cause undefined, undesired, or unexpected behavior at the origin server 130. In some embodiments, sending the blocked request to the test environment 136 mitigates any risk to the production environment 134.

Examples of customer device 107 include computing devices (e.g., laptops, desktops, workstations, smartphones, palm tops, mobile phones, tablets, gaming systems, set top boxes, wearable devices, internet-of-things (IoT) devices, electronic devices, etc.) that are capable of managing resources associated with the customer.

The embodiment depicted in FIG. 1 illustrates operations performed by the edge server 120 for handling a request 105 to access a resource hosted by the origin server 130 sent by a requesting device 104. The request 105 may be received via an HTTP session between the requesting device 104 and the edge server 120. The edge server 120 can be configured to receive requests to access and/or modify resources hosted by the origin server 130, and further configured to receive responses to such requests from the origin server 130. For example, internet traffic (e.g., HTTP/S requests/responses) that is destined to an external destination such as the origin server 130, is received at the edge server 120. As an example, the edge server 120 may act as a forward proxy that can receive internet traffic from clients that are configured to send traffic to the edge server 120. As another example, the edge server 120 may act as a reverse proxy that can receive internet traffic directed to the origin server 130. Thus, the edge server 120 can receive traffic from multiple traffic sources (e.g., data centers, offices, devices, cloud properties) and route the traffic to its intended destination. The edge server 120 may be one of multiple (e.g., hundreds or more) edge servers. Such edge servers may be distributed in different colocation centers (colos), data centers, and/or point-of-presences (POP).

The edge server 120 includes a request/response analyzing module 122 and databases, or data structures, including a local request/response pairs database 124. The request/response analyzing module 122 may be configured to analyze request messages and response messages to determine whether request messages include malicious content and whether response messages indicate a corresponding origin server has a vulnerability. The local request/response pairs database 124 stores log data associated with requests and responses processed by the edge server 120. In some embodiments, the edge server 120 stores requests and responses associated with requests that are blocked by the edge server 120. In other embodiments, the edge server 120 stores all requests and responses associated with requests that are received by the edge server 120. In some embodiments, the edge server 120 stores requests and responses in the local request/response pairs database 124 for a specific amount of time.

Upon receiving the request 105, the request/response analyzing module 122 of the edge server 120 can determine whether the request has indications of including malicious content (e.g., a malicious payload). In some embodiments, the request/response analyzing module 122 extracts attributes of the request 105 (e.g., an IP address) and generates a signature for the request based on the extracted attributes. The request/response analyzing module 122 can then compare the generated signature with the signatures of known or existing malicious content. In other embodiments, the request/response analyzing module 122 extracts attributes of the request 105 and, using a machine learning model trained to analyze request attributes, determine the likelihood of the request including malicious content.

When the request/response analyzing module 122 determines that the request 105 includes malicious content, the edge server 120 can block the request 105 from being transmitted to the production environment 134 of the origin server 130. In addition, the edge server 120 can direct a new request based on the request 105 to the test environment 136, or an acceptance origin server, running a similar software build as the production environment 134 of the origin server 130. In some embodiments, the new request generated by edge server 120 can be a copy of the request 105. The edge server 120 can then initiate a new HTTP session between the edge server 120 and the origin server 130 to transmit the new request. In such embodiments, while the edge server 120 blocks the request 105, sending the copy of the request 105 to the test environment 136 instead of the production environment 134 of the origin server 130 can prevent the occurrence of unexpected or undefined behavior. In other embodiments, the copy of the request 105 can be directed to a different domain (e.g., based on customer policies or configuration).

In some embodiments, prior to sending the copy of the request 105 to the test environment 136 of the origin server 130, the edge server 120 can modify the request 105 by adding a header that includes an indication that the request 105 was identified by the edge server 120 as potentially including malicious content.

In some embodiments, when the request/response analyzing module 122 determines that the request 105 includes malicious content, the edge server 120 can further send a message to the requesting device 104 indicating that the request 105 was blocked. The edge server 120 can also terminate an HTTP session between the requesting device 104 and the edge server 120.

When the request/response analyzing module 122 determines that the request 105 does not include malicious content, the edge server 120 can process the request 105 normally, including sending the request 105 to the production environment 134 of the origin server 130 and forwarding any response to the requesting device 104.

In some embodiments, the origin server 130 receives the request 105 at a test environment 136 and generates a response 138 to the request 105. The origin server 130 can then transmit the response 138 back to the edge server 120. In some embodiments, the edge server 120 can store the response 138 with the request 105 in the local request/response pairs database 124. In some embodiments, the request 105 and the response 138 are stored together in the local request/response pairs database 124. In other embodiments, the request 105 is stored in a request log and the response is stored in a response log. In such embodiments, the edge server 120 can correlate the entry in the request log with the entry in the response log (e.g., using a request identifier).

In some embodiments, each edge server 120 of a distributed cloud computing network can maintain a separate local request/response pairs database 124 that stores the information for requests/responses received by the corresponding edge server 120. In embodiments, each edge server 120 can periodically send/transmit updates made to their local request/response pairs database 124 for storage at a request/response pairs database 146 hosted by the centralized server 140.

In some embodiments, the customer can define locality-based requirements on the storage of customer data. For example, if a request directed to a European origin server is initially received at a datacenter in the United States, the datacenter in the United States can forward the request to the closest European datacenter, who can then decrypt the request and process it locally using its local request/response analyzing module 122.

In some embodiments, the request/response analyzing module 122 at the edge server 120 can analyze the request/response pair. For example, the request/response analyzing module 122 at the edge server 120 can then determine whether the response 138 indicates that the origin server 130 has a vulnerability. In other embodiments, the request/response analyzing module 142 at the centralized server 140 can analyze the request/response pair after they are transmitted to the centralized server 140.

In some embodiments, the request/response analyzing module 122 determines that the origin server 130 has a vulnerability by analyzing the response 138. For example, the origin server 130 may have a vulnerability if the response 138 includes sensitive information or unfiltered application debug output that would have been transmitted to the requesting device 104 if the request 105 has not been previously blocked by the edge server 120.

In some embodiments, the request/response analyzing module 122 determine whether origin server 130 has a vulnerability using known rules (e.g., OWASP Core Rule Set) that may have known CVEs. In such embodiments, if the request 105 hits a firewall rule, known CVEs associated with the firewall rule, and corresponding known indicators of compromise, can be identified. In such embodiments, when the response 138 is received, the request/response analyzing module 122 can compare the response 138 with the known indicators of compromise. If there is a match or similarity, the request/response analyzing module 122 can determine that the origin server is vulnerable.

In some embodiments, if the request 105 does not match a firewall rule, the request/response analyzing module 122 can pass the request 105 through a trained machine learning model to perform a secondary evaluation to determine if the request 105 has indications of malicious content. In such embodiments, the machine learning model can be further trained on actual requests and responses received by the request/response analyzing module 122 to learn what may be vulnerable payloads.

In some embodiments, the centralized server 140 includes a reporting module 144 that can provide information to the customer regarding requests blocked by the cloud-based application vulnerability detection service 102 and the vulnerability of the origin server 130. For example, the reporting module 144 can send a message to the customer device 107 that indicates that the vulnerability (e.g., request 105) has been blocked by the cloud-based application vulnerability detection service 102 and that the origin server 130 is subject to a determined vulnerability. In situations where the request/response analyzing module 122 did not determine that a vulnerability exists, the reporting module 144 can send a message to the customer device 107 to indicate that a request was blocked but the origin server 130 is not subject to a vulnerability.

Figure 2:
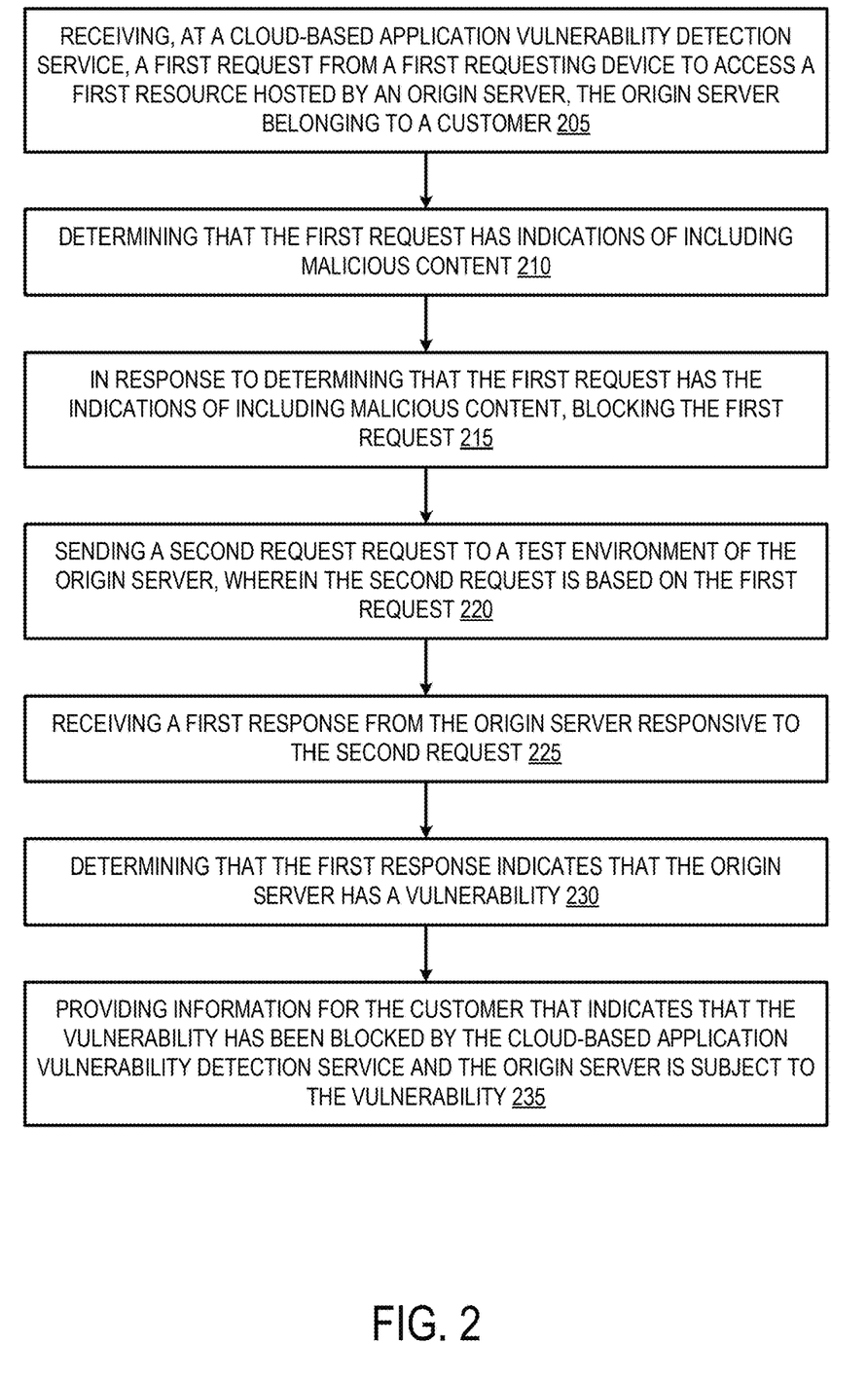
FIG. 2 is a flow diagram that illustrates exemplary operations for determining the vulnerability of origin servers to malicious requests by a cloud-based application vulnerability detection service according to an embodiment.

FIG. 2 is a flow diagram that illustrates exemplary operations for determining the vulnerability of origin servers to malicious requests by a cloud-based application vulnerability detection service according to an embodiment. The operations of FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2. The operations of FIG. 2 are described as being performed by a cloud-based application vulnerability detection service (e.g., cloud-based application vulnerability detection service 102).

In operation 205, a cloud-based application vulnerability detection service receives a first request from a first requesting device to access a first resource hosted by an origin server, the origin server belonging to a customer. In some embodiments, an edge server of the cloud-based application vulnerability detection service receives the first request. The first request may include a request for an action to be performed on the first resource hosted by an origin server. In some embodiments, the edge server receives the first request from a requesting device. Examples of requesting devices include computing devices (e.g., laptops, desktops, workstations, smartphones, palm tops, mobile phones, tablets, gaming systems, set top boxes, wearable devices, internet-of-things (IoT) devices, electronic devices, etc.) that are capable of transmitting and/or receiving network traffic. In some embodiments, the requesting device executes a client network application that is capable of transmitting and/or receiving network traffic. For example, the client network applications may be a web browser or other application that can access network resources (e.g., web pages, images, word processing documents, PDF files, movie files, music files, or other computer files).

In operation 210, the cloud-based application vulnerability detection service determines that the first request has indications of including malicious content. In some embodiments, the edge server includes a request/response analyzing module configured to analyze the first request to determine if there are indications of malicious content, such as a malicious payload. In some embodiments, the request/response analyzing module extracts attributes of the first request (e.g., an IP address) and generates a signature for the first request based on the extracted attributes. The request/response analyzing module can then compare the generated signature for the first request with the signatures of known or existing malicious content. If the generated signature matches known or existing malicious content, the first request has indications of including malicious content. Conversely, if the generated signature does not match known or existing malicious content, the first request does not have indications of including malicious content.

In other embodiments, the request/response analyzing module uses a trained machine learning model to determine if there are indications of malicious content. For example, the machine learning model may be trained using a training set that includes requests with malicious content and requests without malicious content. In such embodiments, the machine learning model can predict whether the first request has indications of malicious content based on the attributes of the first request.

In operation 215, the cloud-based application vulnerability detection service blocks the first request in response to determining that the first request has the indications of including malicious content. In some embodiments, the edge server can transmit a response or notification to the requesting device indicating that the request was blocked.

In operation 220, the cloud-based application vulnerability detection service sends a second request to a test environment of the origin server, wherein the second request is based on the first request. For example, the second request can be a new request generated by the edge server that includes a copy of the first request. In some embodiments, prior to sending the second request to the test environment of the origin server, the edge server modifies the second request by adding a header. For example, the header can include an indication that the edge server identified the first request as potentially including malicious content. In other embodiments, the second request is not modified to include any indication of the potentially malicious content detected in the first request to obtain an unbiased response from the origin server.

In some embodiments, the second request is sent to the origin server in real-time. In other embodiments, the second request can be stored and sent to the origin server at a later time (e.g., during a time of less traffic directed to the origin server, during a time designated by a customer associated with the origin server, etc.).

In some embodiments, the second request is sent to the test environment instead of the production environment of the origin server to prevent the occurrence of unexpected or undefined behavior. In other embodiments, the second request can be directed to a different domain (e.g., based on customer policies or configuration). In embodiments where an origin server does not have a test environment, the second request can be sent to the production environment, with or without the header to indicate to the origin server that the first request was already blocked and any response to the request will not be served to the requesting device.

In some embodiments, the cloud-based application vulnerability detection service applies rate limiting rules to determine whether to transmit the second request to the origin server. The rate limiting rules can prevent overloading the origin server with requests that include malicious content. The rate limiting rules can also prevent the sending of all malicious requests that match a same firewall rule, and which may return the same or similar response, when sending a couple requests is sufficient for determining the vulnerability of the origin server. In one embodiment, a rate limiting rule can be based on the absolute number of requests per firewall rule ID in a certain timeframe. Such embodiments can ensure that all payloads matching a particular firewall rule are potentially evaluated and blocked, while not sending every instance of those payloads to the origin server. For example, customers will not need to know that a certain application is vulnerable to a certain malicious payload every five minutes, every hour, etc. In other embodiments, multiple requests that match a same firewall rule ID and that have different payloads may all be sent through as they may have different signatures. In some embodiments, a rate limiting rule can be based on the percentage of total traffic. For example, if the amount of requests with malicious content is 0.1%, at most 0.1% of the requests with malicious content are sent to the origin server. In other embodiments, a rate limiting rule can be based on the absolute number of requests in a certain timeframe.

In operation 225, the cloud-based application vulnerability detection service receives a first response from the origin server responsive to the first request. In embodiments, the first response from the origin server is the response that would typically have been transmitted to the requesting device if the first request had not been previously blocked by the cloud-based application vulnerability detection service.

In operation 230, the cloud-based application vulnerability detection service determines that the first response indicates that the origin server has a vulnerability. In some embodiments, the analysis of the first response is performed by the request/response analyzing module at the edge server. In other embodiments, the first response is sent to the centralized server and the analysis of the first response is performed by the request/response analyzing module at the centralized server. In such embodiments, the request and corresponding response can either be stored locally in a local request/response pairs database at the edge server and then later transmitted to the centralized server, or the request and corresponding response can be automatically sent to the centralized server as it is received.

The request/response analyzing module can determine that the origin server has a vulnerability when the first response from the origin server includes sensitive information. In some embodiments, when the first response indicates that the origin server has a vulnerability, the cloud-based application vulnerability detection service encrypts the first response using an encryption key of the customer associated with the origin server. In other embodiments, when the first response from the origin server includes sensitive information, the first response is not stored by the cloud-based application vulnerability detection service. In some embodiments, when the first response indicates that the origin server does not have a vulnerability, the request/response analyzing module does not save the first response.

In some embodiments, as part of identifying that the first request has indications of malicious content, the request/response analyzing module can further identify the common vulnerabilities and exposures (CVEs) that the malicious content relates to. In some embodiments, the request/response analyzing module can then access a database that indicates types of responses to a compromised CVE that can be expected. If the first response to the first request has a similar response, the origin server, or an application running on the origin server, can be determined to be vulnerable.

In operation 235, the cloud-based application vulnerability detection service provides information to the customer that indicates that the vulnerability has been blocked by the cloud-based application vulnerability detection service and the origin server is subject to the vulnerability. In some embodiments, a reporting module of the centralized server can provide information to the customer reporting the vulnerabilities identified by the cloud-based application vulnerability detection service periodically (e.g., based on customer notification configuration data).

In some embodiments, in situations where the first response indicates that the origin server does not have a vulnerability (e.g., the first response did not include sensitive information), the cloud-based application vulnerability detection service provides information to the customer that indicates that the vulnerability has been blocked by the cloud-based application vulnerability detection service, but the origin server is not subject to the vulnerability.

In some embodiments, the information from the cloud-based application vulnerability detection service may not provide an indication of whether the origin server is vulnerable even if the request included potentially malicious content. For example, such false negatives may occur when the CVEs related to the potentially malicious content in the first request are new or unknown. In such embodiments, the customer can provide a response indicating that the potentially malicious content is actually malicious and that the origin server is vulnerable. The response from the customer can then be used to enhance the cloud-based application vulnerability detection service to address such false negatives.

In some embodiments, the cloud-based application vulnerability detection service can be configured to synthesize request traffic to simulate an attack on an origin server. For example, if a request triggers a vulnerability on an application or origin server associated with a first customer, there may be other applications or origin servers associated with other customers that could be similarly vulnerable. In such situations, instead of waiting for a potential attack, the cloud-based application vulnerability detection service can generate a similar request and direct it to the other applications or origin servers associated with other customers to determine their vulnerability.

Figure 3:
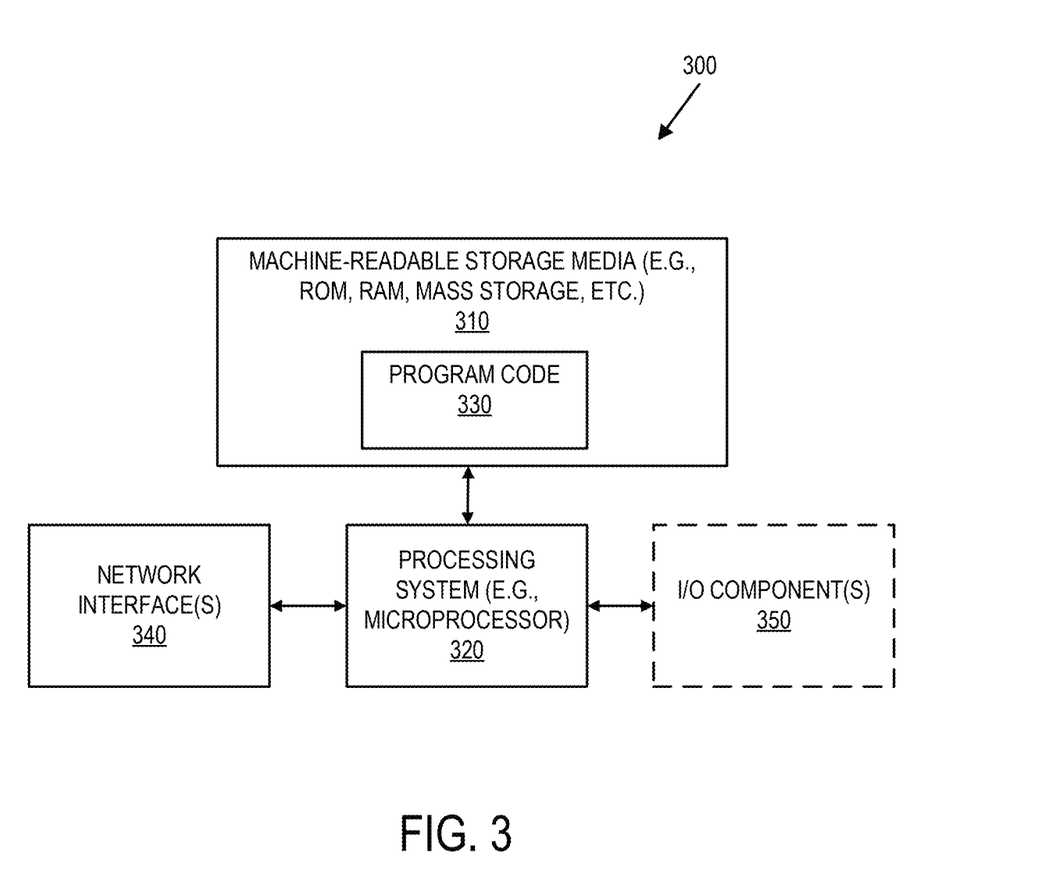
FIG. 3 illustrates a block diagram for an exemplary data processing system that can be used in some embodiments.

FIG. 3 illustrates a block diagram for an exemplary data processing system 300 that may be used in some embodiments. One or more such data processing systems 300 may be used to implement the embodiments and operations described with respect to the edge server, configuration server, or other electronic devices. The data processing system 300 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 310 (e.g., magnetic disks, optical disks, read only memory (ROM), flash memory devices, phase change memory) and machine-readable transmission media (also called a carrier) (e.g., electrical, optical, radio, acoustical or other form of propagated signals-such as carrier waves, infrared signals), which is coupled to the processing system 320 (e.g., one or more processors and connected system components such as multiple connected chips). For example, the depicted machine-readable storage media 310 may store program code 330 that, when executed by the processing system 320, causes the data processing system 300 to perform any of the operations described herein.

The data processing system 300 also includes one or more network interfaces 340 (e.g., a wired and/or wireless interfaces) that allows the data processing system 300 to transmit data and receive data from other computing devices, typically across one or more networks (e.g., Local Area Networks (LANs), the Internet, etc.). The data processing system 300 may also include one or more input or output ("I/O") components 350 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices.

Additional components, not shown, may also be part of the data processing system 300, and, in certain embodiments, fewer components than that shown in FIG. 3 may also be used in a data processing system 300. One or more buses may be used to interconnect the various components shown in FIG. 3.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals-such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving, at a cloud-based application vulnerability detection service, a first request from a first requesting device to access a first resource hosted by an origin server, the origin server belonging to a customer;
   determining that the first request has indications of including malicious content based on a signature for the first request generated based on extracted attributes of the first request;
   in response to determining that the first request has the indications of including the malicious content, blocking the first request;
   sending a second request to a test environment of the origin server, wherein the second request is based on the first request;
   receiving a first response from the origin server responsive to the second request;
   determining that the first response indicates that the origin server has a vulnerability; and
   providing information for the customer that indicates that the vulnerability has been blocked by the cloud-based application vulnerability detection service and the origin server is subject to the vulnerability.

2. The method of claim 1, wherein sending the second request to the test environment of the origin server further comprises:
   adding a header to the second request to indicate that the first request has the indications of including the malicious content.

3. The method of claim 1, wherein blocking the first request further comprises:
   transmitting a second response to the first requesting device indicating that the first request was blocked.

4. The method of claim 1, wherein determining that the first response indicates that the origin server has the vulnerability further comprises:
   determining that the first response includes sensitive information; and
   encrypting the first response from the origin server using an encryption key of the customer associated with the origin server.

5. The method of claim 1, wherein sending the second request to the test environment of the origin server includes applying a rate limiting rule for transmission of requests having indications of including malicious content to the origin server.

6. The method of claim 1, further comprising:
   receiving, at the cloud-based application vulnerability detection service, a third request from a second requesting device to access a second resource hosted by the origin server;
   determining that the third request has indications of including malicious content;
   in response to determining that the third request has the indications of including the malicious content, blocking the third request;
   sending a fourth request to the test environment of the origin server, wherein the fourth request is based on the third request;
   receiving a second response from the origin server responsive to the fourth request;
   determining that the second response indicates that the origin server is not vulnerable; and
   providing information to the customer that indicates that the vulnerability has been blocked by the cloud-based application vulnerability detection service and the origin server is not vulnerable.

7. A non-transitory machine-readable storage medium that provides instructions that, if executed by a processor, will cause said processor to perform operations comprising, comprising:
   receiving, at a cloud-based application vulnerability detection service, a first request from a first requesting device to access a first resource hosted by an origin server, the origin server belonging to a customer;
   determining that the first request has indications of including malicious content based on a signature for the first request generated based on extracted attributes of the first request;
   in response to determining that the first request has the indications of including the malicious content, blocking the first request;

sending a second request to a test environment of the origin server, wherein the second request is based on the first request;

receiving a first response from the origin server responsive to the second request;

determining that the first response indicates that the origin server has a vulnerability; and providing information for the customer that indicates that the vulnerability has been blocked by the cloud-based application vulnerability detection service and the origin server is subject to the vulnerability.

8. The non-transitory machine-readable storage medium of claim 7, wherein sending the second request to the test environment of the origin server further comprises:

adding a header to the second request to indicate that the first request has the indications of including the malicious content.

9. The non-transitory machine-readable storage medium of claim 7, wherein blocking the first request further comprises:

transmitting a second response to the first requesting device indicating that the first request was blocked.

10. The non-transitory machine-readable storage medium of claim 7, wherein determining that the first response indicates that the origin server has the vulnerability further comprises:

determining that the first response includes sensitive information; and encrypting the first response from the origin server using an encryption key of the customer associated with the origin server.

11. The non-transitory machine-readable storage medium of claim 7, wherein sending the second request to the test environment of the origin server includes applying a rate limiting rule for transmission of requests having indications of including the malicious content to the origin server.

12. The non-transitory machine-readable storage medium of claim 7, wherein the operations further comprise:

receiving, at the cloud-based application vulnerability detection service, a third request from a second requesting device to access a second resource hosted by the origin server;

determining that the third request has indications of including malicious content;

in response to determining that the third request has the indications of including the malicious content, blocking the third request;

sending a fourth request to the test environment of the origin server, wherein the fourth request is based on the third request;

receiving a second response from the origin server responsive to the fourth request;

determining that the second response indicates that the origin server is not vulnerable; and providing information to the customer that indicates that the vulnerability has been blocked by the cloud-based application vulnerability detection service and the origin server is not vulnerable.

13. A server, comprising:

a processor; and a non-transitory machine-readable storage medium that provides instructions that, if executed by the processor, will cause the server to perform operations including:

receiving, at a cloud-based application vulnerability detection service, a first request from a first requesting device to access a first resource hosted by an origin server, the origin server belonging to a customer;

determining that the first request has indications of including malicious content based on a signature for the first request generated based on extracted attributes of the first request;

in response to determining that the first request has the indications of including the malicious content, blocking the first request;

sending a second request to a test environment of the origin server, wherein the second request is based on the first request;

receiving a first response from the origin server responsive to the second request;

determining that the first response indicates that the origin server has a vulnerability; and providing information for the customer that indicates that the vulnerability has been blocked by the cloud-based application vulnerability detection service and the origin server is subject to the vulnerability.

14. The server of claim 13, wherein sending the second request to the test environment of the origin server further comprises:

adding a header to the second request to indicate that the first request has the indications of including the malicious content.

15. The server of claim 13, wherein blocking the first request further comprises:

transmitting a second response to the first requesting device indicating that the first request was blocked.

16. The server of claim 13, wherein determining that the first response indicates that the origin server has the vulnerability further comprises:

determining that the first response includes sensitive information; and encrypting the first response from the origin server using an encryption key of the customer associated with the origin server.

17. The server of claim 13, wherein sending the second request to the test environment of the origin server includes applying a rate limiting rule for transmission of requests having indications of including the malicious content to the origin server.

18. The server of claim 13, wherein the operations further comprise:

receiving, at the cloud-based application vulnerability detection service, a third request from a second requesting device to access a second resource hosted by the origin server;

determining that the third request has indications of including malicious content;

in response to determining that the third request has the indications of including the malicious content, blocking the third request;

sending a fourth request to the test environment of the origin server, wherein the fourth request is based on the third request;

receiving a second response from the origin server responsive to the fourth request;

determining that the second response indicates that the origin server is not vulnerable; and providing information to the customer that indicates that the vulnerability has been blocked by the cloud-based application vulnerability detection service and the origin server is not vulnerable.

* * * * *